United States Patent
Little

[15] 3,643,087
[45] Feb. 15, 1972

[54] HEADLAMP ASSEMBLY
[72] Inventor: Sheldon G. Little, Birmingham, Mich.
[73] Assignee: General Motors Corporation, Detroit, Mich.
[22] Filed: Mar. 30, 1970
[21] Appl. No.: 23,574

[52] U.S. Cl. ............................................. 240/41.6, 240/90
[51] Int. Cl. ....................................................... F21v 19/02
[58] Field of Search ......................................... 240/41.6, 90

[56] References Cited

UNITED STATES PATENTS 2,911,523  11/1959  Falge ................................... 240/41.6
3,502,862  3/1970  Hedgewick .......................... 240/41.5
2,824,214  2/1958  Bertsche .................................. 240/41
2,286,448  1/1942  Wahlberg ............................ 240/41.5

Primary Examiner—Richard C. Queisser
Assistant Examiner—John Whalen
Attorney—J. L. Carpenter, E. J. Biskup and Peter D. Sachtjen

[57] ABSTRACT

A headlamp assembly for a motor vehicle wherein the reflector of a headlamp is directly universally supported on a flexible conical lip of a plastic support cylinder. The headlamp is resiliently biased into seating arrangement with the lip and selectively positioned thereabout by means of circumferentially spaced aiming screws and extension springs.

1 Claim, 4 Drawing Figures

PATENTED FEB 15 1972

3,643,087

INVENTOR.
Sheldon G. Little
BY
Peter D. Sachtjen
ATTORNEY

HEADLAMP ASSEMBLY

The present invention relates to headlamp assemblies for motor vehicles and, in particular, to a headlamp mounting for selectively positioning the projected light beam from a headlamp lighting unit.

Presently, most headlamp assemblies for motor vehicles use a mounting having a ball and socket connection for aiming the headlight beam. This mounting typically includes a metallic mounting ring having a spherical surface which is universally adjustably seated against a metallic socket member. A headlamp is positioned on the mounting ring and fixedly clamped thereagainst by a retaining ring and mechanical fasteners. A pair of aiming screws and a tensioned compensating spring serve to rearwardly bias the spherical surface against the socket member and, additionally, provide the adjusting means for selectively positioning the projected light beam in the horizontal and vertical aiming planes.

The present invention contemplates a novel headlamp mounting which eliminates many of the aforementioned components thereby simplifying the resultant structure. More specifically, the universal connection provided by the mounting ring and the socket member is replaced by a direct interaction between a plastic support cylinder and the headlamp. The support cylinder includes a frontal flexible lip which resiliently engages and conforms to the shape of the headlamp reflector. The retaining ring, instead of constituting a rigid clamping member, engages the outer periphery of the headlamp lens and is rearwardly resiliently biased by means of intermediary aiming screws and extension springs. The flexibility of the support lip thus provides a resilient universal connection and, as complemented by the extension springs, cushions and absorbs vibration without affecting headlamp aim. The interaction of the reflector and seating lip are additionally equally advantageous in that the frictional resistance to aiming movement is relatively low and neither part is subject to corrosion and the consequent binding which is sometimes associated with metallic parts.

Other features and advantages will be apparent to one skilled in the art upon reading the following detailed description, reference being made to the accompanying drawings in which.

Figure 1:
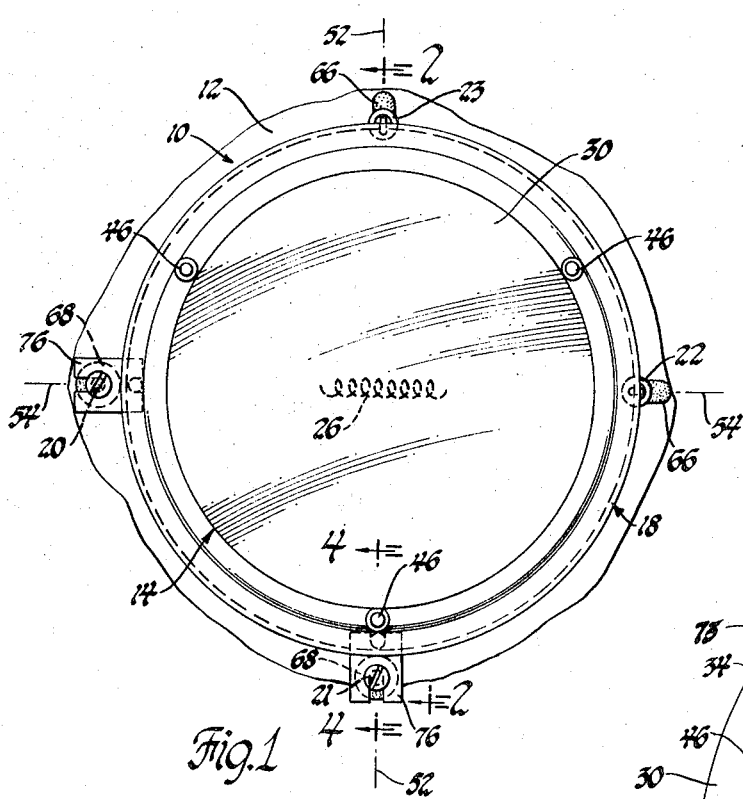
FIG. 1 is a front view of a motor vehicle headlamp assembly made in accordance with the present invention.
Figure 3:
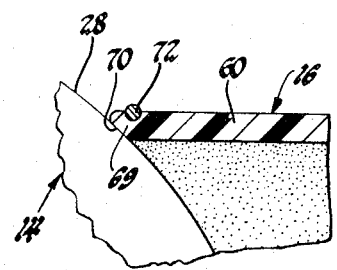
FIG. 3 is an enlarged fragmentary view of the universal connection between the support cylinder and the reflector.

Referring to the drawings, a headlamp assembly 10 made in accordance with the present invention is fixedly mounted on a front body panel 12 of a motor vehicle. A pair of headlamp assemblies 10 are installed in symmetrical relationship with respect to the longitudinal axis of the vehicle to form a conventional two-lamp or four-lamp lighting system. Each headlamp assembly 10 generally comprises a headlamp 14, a support housing 16, and a retaining ring 18. The projected beam of the headlamp 14 is universally adjustably positioned in a manner to be subsequently described by means of equally circumferentially spaced aiming screws 20, 21 and extension springs 22, 23.

Figure 2:
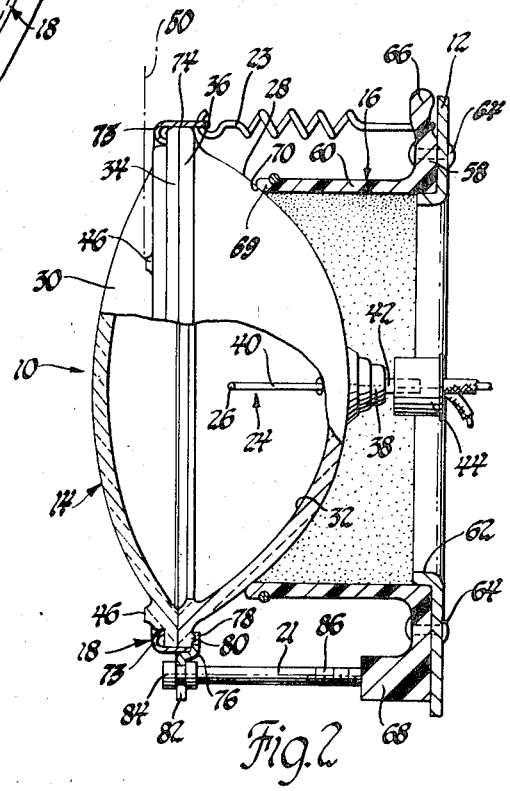
FIG. 2 is a view taken along line 2—2 of FIG. 1.
Figure 4:
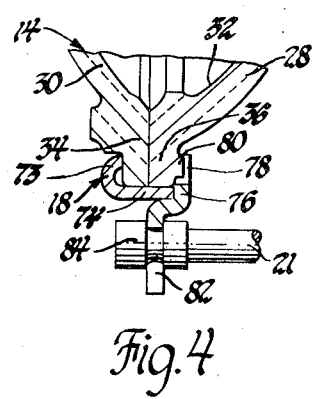
FIG. 4 is an enlarged view taken along line 4—4 of FIG. 1.

Referring to FIG. 2, the headlamp 14 is a lighting unit of the conventional all glass sealed beam construction and comprises a light source 24 carrying a helically coiled filament 26 enclosed by a reflector 28 and a lens 30. The reflector 28 is in the form of a paraboloid and has a reflective inner surface 32 for imparting directional control to light rays emanating from filament 26. The lens 30 includes suitable optical faceting for imparting directional control to the light beam controlled by the reflector 28. The lens 30 is integrally joined to the reflector 28 by fusing at mating annular flanges 34 and 36. The filament 26 is supported on a lead wire 38 which is structurally attached to an inner surface of metal ferrules 40 embedded into the rear surface of the reflector 28. An electrical terminal 42 is soldered to each of the ferrules 40. An electrical connector 44 attached to the terminal 42 serves to electrically connect the filament 26 to a suitable source of electric power.

The headlamp 14 thus far described is adjustably mounted on the vehicle to distribute illumination in desired horizontal and vertical aiming planes. To facilitate proper positioning of the projected light beam, the lens 30 is provided with a plurality of circumferentially spaced reference elements or pads 46 of the type disclosed in Arnold U.S. Pat. No 2,870,362, assigned to the assignee of the present invention. Briefly, the pads 46 define an aiming plane 50 which, when positioned in a known plane relative to the vehicle, will direct a projected light beam in a desired horizontal or vertical distribution relative to the longitudinal axis of the vehicle. As illustrated with reference to FIG. 1, proper horizontal headlamp aim will be achieved when the aiming plane 50 is correctly positioned with respect to a vertical axis 52. Proper vertical headlamp aim will be achieved when the aiming plane 50 is correctly positioned with respect to a transverse or horizontal axis 54.

The support housing 16 is formed of a moldable low friction plastic material and includes a circular base 58 and an axially extending cylindrical sleeve 60. A forwardly projecting annular lip 62 formed on the body panel 12 engages the inner surface of the sleeve 60 to align the support housing 16 on the vehicle. A plurality of circumferentially spaced rivets 64 fixedly attach the support housing 16 to the panel 12. A pair of radially outwardly projecting tabs 66 are formed at the periphery of the base 58 in line with the mutually perpendicular axis 52 and 54. A pair of forwardly projecting threaded bosses 68 are integrally molded with the base 58 in diametrically opposed relation to the tabs 66. The support housing 16 terminates with a flexible support lip 69 having a conical or otherwise concave seating surface 70. A metal hoop 72 retained in an annular groove at the forward end of the housing 16 serves to maintain the circumference of the seating surface 70 while permitting a limited flexing so that the lip 69 can conform to the gradually changing contour of the reflector 28. In this respect, the conical angle of the surface 70 is selected to provide a contour which most closely approximates the mating surface of the reflector paraboloid throughout the probable range of aiming adjustment.

The retaining ring 18 generally includes an inwardly turned annular rim 73 which engages the flange 34 and a rearwardly extending cylindrical sleeve 74. A pair of locating clips 76 are attached to the sleeve 74 and are circumferentially spaced so as to axially register with the bosses 68. Each clip 76 has a slotted inner leg 78 which engages a projection 80 on the flange 36 of the reflector 28 to circumferentially index the headlamp 14 relative to the retaining ring 18. The clip 76 additionally includes an outwardly extending slotted leg 82 which accommodates the grooved head 84 of the aiming screw 20, the latter including a threaded shank 86 adjustably received within the bosses 68. The extension springs 22, 23 serve to resiliently bias the reflector 28 directly against the seating surface 70. The flexibility of the lip 69 provides additional resiliency to absorb road vibrations at the support interface without a resultant disturbance of headlamp aim.

With the aforementioned arrangement of components, the headlamp 14 is positioned in a vertical aiming plane by rotating the aiming screw 21 to move reflector 28 about the seating surface 70 as pivotally controlled on the axis 54 by the spring 22 and the screw 20. To position the headlamp 14 in a horizontal aiming plane about the vertical axis 52, the aiming screw 20 is selectively rotated thereby pivoting the reflector 28 about the vertical axis 52 established by the spring 23 and the screw 21. During either of these aiming operations, the low friction universal connection at the seating interface between the lip 69 and the reflector 28 accommodates the full universal adjustment without binding. Moreover, the flexibility of the lip portion of the sleeve 60 enables the latter to accurately conform to the changing contour of the reflector 28.

Although only one form of this invention has been shown and described, other forms will be readily apparent to those skilled in the art. Therefore, it is not intended to limit the scope of this invention by the embodiment selected for the purpose of this disclosure, but only by the claims which follow.

What is claimed is:

1. A motor vehicle headlamp assembly, comprising: a headlamp including a paraboloidal reflector and a lens integrally joined at mating annular flanges; a support cylinder formed of a flexible plastic material, said support cylinder having a circular based adapted to be attached to the motor vehicle and a forwardly projecting cylindrical support sleeve; a flexible annular lip formed at the front end of said support sleeve, a conical seating surface on said front end directly engaging the outer surface of said reflector; an annular groove formed in the support sleeve adjacent said lip; hoop means retained in said groove for maintaining the circumference of said support sleeve while permitting limited flexing of said lip such that the latter can conform to the changing contour of the paraboloidal surface during universal movement of said headlamp to an aimed position; a pair of threaded bosses integrally formed with said base aligned with a horizontal axis and a vertical axis of the vehicle; a pair of tabs formed in said base in diametrically opposed relationship to said bosses; an annular retaining ring engaging the lens flange and having a rearwardly extending cylindrical sleeve; a pair of locating clips attached to the sleeve and engaging said reflector flange to circumferentially index the headlamp, said clips being circumferentially spaced so as to axially register with the bosses; a pair of aiming screws adjustably connected to the bosses and having a grooved head operatively connected to said locating clips, said aiming screws being operable to position said headlamp about said horizontal and vertical axes, and a pair of extension springs yieldingly connected between said sleeve and said tabs for rearwardly biasing said mounting ring and said headlamp into resilient seating engagement with said conical surface, said springs in combination with the flexibility of the lip absorbing road vibrations at the support interface between the reflector and the seating surface without disturbing the position of the headlamp.

\* \* \* \* \*